United States Patent
Fitzgerald et al.

(10) Patent No.: US 12,160,925 B2
(45) Date of Patent: Dec. 3, 2024

(54) ENHANCED DEVICE DISCOVERY TO SUPPORT MULTIPLE CLIENTS AND HIGH DATA BANDWIDTH

(71) Applicant: ZEBRA TECHNOLOGIES CORPORATION, Lincolnshire, IL (US)

(72) Inventors: Thomas Fitzgerald, Coventry, CT (US); Tharindu S. Rathnathunga, Piliyandala (LK); Thomas C. Bellizzi, Jr., Farmingville, NY (US); Pragnesh Kishorbhai Sanchaniya, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/288,924

(22) PCT Filed: Apr. 25, 2022

(86) PCT No.: PCT/US2022/026136
§ 371 (c)(1),
(2) Date: Oct. 30, 2023

(87) PCT Pub. No.: WO2022/232019
PCT Pub. Date: Nov. 3, 2022

(65) Prior Publication Data
US 2024/0205660 A1    Jun. 20, 2024

(30) Foreign Application Priority Data
Apr. 30, 2021   (IN) .............................. 202111019904

(51) Int. Cl.
*H04W 8/00* (2009.01)
*H04L 41/12* (2022.01)

(52) U.S. Cl.
CPC .............. *H04W 8/005* (2013.01); *H04L 41/12* (2013.01)

(58) Field of Classification Search
CPC .............................. H04W 8/005; H04L 41/12
See application file for complete search history.

(56) References Cited

U.S. PATENT DOCUMENTS

2007/0192329 A1   8/2007   Croft et al.
2008/0130604 A1   6/2008   Boyd
(Continued)

OTHER PUBLICATIONS

Kim, Seong-Min, Hoan-Suk Choi, and Woo-Seop Rhee. "IoT home gateway for auto-configuration and management of MQTT devices." 2015 IEEE Conference on Wireless Sensors (ICWiSe). IEEE, 2015 (Year: 2015).*
(Continued)

*Primary Examiner* — Caroline H Jahnige
(74) *Attorney, Agent, or Firm* — Yuri Astvatsaturov

(57) ABSTRACT

Systems and methods for enhanced device discovery to support multiple clients and high data bandwidth are disclosed herein. An example method includes a method for discovering networked devices on a network having a client application executing on a client device communicatively coupled to the networked devices, the method comprising: transmitting a first inquiry over the network; receiving a first list of devices corresponding to the first inquiry; transmitting a second inquiry over the network; receiving a second list of devices corresponding to the second inquiry; aggregating the first list and the second list to form an aggregate list, the aggregate list including a list of networked devices of interest; and, for at least one of the networked devices of interest, establishing a publisher/subscriber relationship between the at least one of the networked devices and the client application.

18 Claims, 6 Drawing Sheets

(56) References Cited

U.S. PATENT DOCUMENTS

| | | | |
|---|---|---|---|
| 2008/0285558 A1* | 11/2008 | Wu | G03G 15/5079 |
| | | | 370/390 |
| 2011/0255444 A1 | 10/2011 | Soliman et al. | |
| 2014/0222958 A1 | 8/2014 | Bostick et al. | |
| 2017/0178626 A1 | 6/2017 | Gruber et al. | |
| 2018/0109633 A1* | 4/2018 | Brzozowski | H04L 67/10 |
| 2018/0152525 A1* | 5/2018 | Kapoor | H04L 67/10 |

OTHER PUBLICATIONS

International Search Report and Written Opinion for International Application No. PCT/US2022/026136 mailed on Jul. 18, 2022.

\* cited by examiner

| Name | Model Name | IP | Serial No. | Mfg. Date | Firmware |
|---|---|---|---|---|---|
| ← → TG592u7j Camera | TY68 | 188.286.107.62 | 4635628760 9816 | 15OCT19 | TUUGFF11-246-M44G8 |

OVERVIEW

FW Version: TGGFUU11-998-M55G7
Description:
Core Service Version:
Device Management Version:
ChiCore Library Version:

COMMUNICATIONS

Available Connection Typess: Status: Connected
Current Connection Type:
Connection Port:
HID Port:
IP Mode (Static/DHCP):

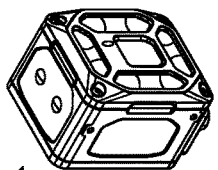

| | WF678s2m Camera | GM86 | 177.244.156.84(USB) | 653271 | 12JUN19 | TUUGFF11-246-M44G8 |

OVERVIEW

FW Version: TGGFUU11-998-M55G7
Description:
Core Service Version:
Device Management Version:
ChiCore Library Version:

COMMUNICATIONS

Available Connection Typess: Status: Connected
Current Connection Type:
Connection Port:
HID Port:
IP Mode (Static/DHCP):

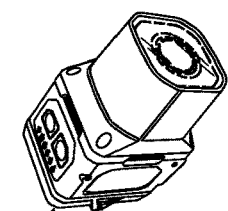

FIG. 2

ENHANCED DEVICE DISCOVERY TO SUPPORT MULTIPLE CLIENTS AND HIGH DATA BANDWIDTH

CROSS-REFERENCE TO RELATED APPLICATIONS

The current application is a national stage of a Patent Cooperation Treaty Application PCT/US2022/26136 filed on Apr. 25, 2022, which is a Patent Cooperation Treaty Application of an Indian Patent Application IN202111019904 filed on Apr. 30, 2021, both of which are incorporated herein by reference in their entirety.

BACKGROUND

In modern computer networks, it may be desirable to discover a particular group of devices. For example, it may be desirable to discover, on a particular network, all devices belonging to a particular company, or all devices of a certain kind (e.g., discover all cameras). However, current techniques for device discovery are cumbersome, and often result in errors in generating a list of discovered devices (e.g., the generated list omits relevant devices).

The techniques disclosed herein provide solutions to these problems and others.

SUMMARY

In an embodiment, the present invention is a method for discovering networked devices on a network having a client application executing on a client device communicatively coupled to the networked devices, the method comprising: transmitting, via the client application, a first inquiry over the network, the first inquiry being a device discovery inquiry executed pursuant to a first protocol using a first library; receiving, at the client application, a first list of devices corresponding to the first inquiry; transmitting, via the client application, a second inquiry over the network, the second inquiry being a device discovery inquiry executed pursuant to a second protocol using a second library, the first library being different from the second library; receiving, at the client application, a second list of devices corresponding to the second inquiry; aggregating the first list and the second list to form an aggregate list, the aggregate list including a list of networked devices of interest; for at least one of the networked devices of interest, establishing a publisher/subscriber relationship between the at least one of the networked devices and the client application; and receiving device data, at the client application, from the at least one of the networked devices via the publisher/subscriber relationship.

In a variation of this embodiment, the first protocol and the second protocol may be the same. In a variation of this embodiment, the first protocol and the second protocol may be a Web Services on Devices protocol.

In a variation of this embodiment, the at least one of the first inquiry or the second inquiry includes a filter parameter. In a variation of this embodiment, the at least one of the first protocol or the second protocol may be a Web Services on Devices protocol, and the filter parameter may be Scope.

In a variation of this embodiment, the first inquiry and the second inquiry are executed in parallel.

In a variation of this embodiment, the method further includes filtering at least one of the first list or the second list based on a filter parameter.

In a variation of this embodiment, the establishing the publisher/subscriber relationship includes connecting to the at least one of the networked devices, via the client application, by a socket connection of the at least one of the networked devices.

In a variation of this embodiment, the publisher is the at least one of the networked devices and the subscriber is the client application.

In a variation of this embodiment, the method further includes performing arbitration by: receiving, at the client application, from the at least one of the networked devices of interest, and via the publisher/subscriber relationship, an indication that a device of the at least one of the networked devices of interest is a locked device; and disallowing the connection to the locked device until the locked device becomes unlocked.

In another embodiment, the present invention is an apparatus for discovering networked devices on a network, the apparatus comprising one or more processors configured to execute a client application, the client application configured to: transmit a first inquiry over the network, the first inquiry being a device discovery inquiry executed pursuant to a first protocol using a first library; receive a first list of devices corresponding to the first inquiry; transmit a second inquiry over the network, the second inquiry being a device discovery inquiry executed pursuant to a second protocol using a second library, the first library being different from the second library; receive a second list of devices corresponding to the second inquiry; aggregate the first list and the second list to form an aggregate list, the aggregate list including a list of networked devices of interest; for at least one of the networked devices of interest, establish a publisher/subscriber relationship between the at least one of the networked devices and the client application; and receive device data from the at least one of the networked devices via the publisher/subscriber relationship.

In a variation of this embodiment, the first protocol and the second protocol are the same. In a variation of this embodiment, the first protocol and the second protocol may be a Web Services on Devices protocol.

In a variation of this embodiment, the at least one of the first inquiry or the second inquiry includes a filter parameter. In a variation of this embodiment, the at least one of the first protocol or the second protocol may be a Web Services on Devices protocol, and the filter parameter may be Scope.

In a variation of this embodiment, the client application is further configured to execute the first inquiry and the second inquiry in parallel.

In a variation of this embodiment, the client application is further configured to filter at least one of the first list or the second list based on a filter parameter.

In a variation of this embodiment, the establishing the publisher/subscriber relationship includes connecting to the at least one of the networked devices, via the client application, by a socket connection of the at least one of the networked devices.

In a variation of this embodiment, the publisher is the at least one of the networked devices and the subscriber is the client application.

In a variation of this embodiment, the client application is further configured to perform arbitration by: receiving, at the client application, from the at least one of the networked devices of interest, and via the publisher/subscriber relationship, an indication that a device of the at least one of the networked devices of interest is a locked device; and disallowing the connection to the locked device until the locked device becomes unlocked.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
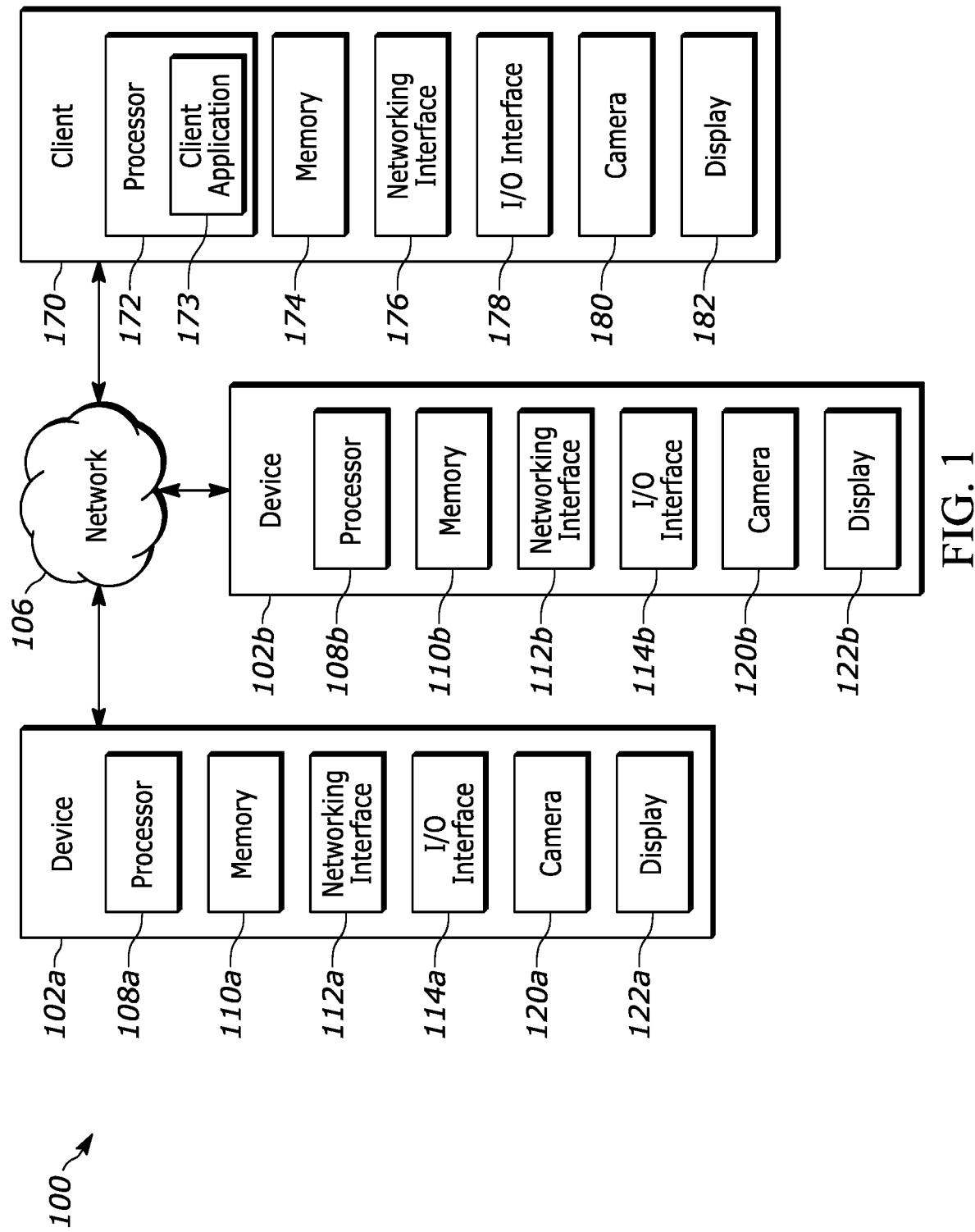
FIG. 1 illustrates an example device discovery system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides techniques for discovering devices on a network, and further for facilitating communication with the discovered devices. For example, there may be a network with many devices from multiple companies, and it may be desirable to discover and communicate with the devices belonging only to a particular company. In another example, there may be a network with many different types of devices, and it may be desirable to discover and communicate with only a particular type of device (e.g., cameras).

FIG. 1 illustrates an example device discovery system 100 configured to discover and facilitate communication with devices on a network, in accordance with various embodiments disclosed herein. In the example embodiment of FIG. 1 the device discovery system 100 includes a first device 102a, a second device 102b, and a client device 170 communicatively coupled together via a network 106.

Generally speaking, the client 170 may be configured to run client application 173, in accordance with the various embodiments disclosed herein (e.g., to discover and facilitate communication with devices 102a, 102b). The client 170 may include one or more processors 172, one or more memories 174, a networking interface 176, an input/output interface 178, the client application 173, and display 182. The client 170 may be implemented on any suitable computing device, including a dedicated computing device, a network accessible server, a cloud-based device, or an combination thereof.

The devices 102a, 102b may comprise any type of devices (e.g., machine vision systems, cameras, scanners, sensors, smoke detectors, carbon monoxide detectors, etc.). (In this regard, in the example of FIG. 1, the devices 102a, 102b comprise cameras 120a, 120b). The devices 102a, 102b may be the same type of device, or different types of devices. Furthermore, although the example of FIG. 1 illustrates only two devices 102a, 102b, it should be understood that any number of devices may be used.

The first device 102a may include one or more processors 108a, one or more memories 110a, a networking interface 112a, an input/output interface 114a, a camera 120a, and display 122a.

The second device 102b may include one or more processors 108b, one or more memories 110b, a networking interface 112b, an input/output interface 114b, a camera 120b, and display 122b.

Each of the one or more memories 110a, 110b, 174 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., client application 173, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108a, 108b, 172 (e.g., working in connection with the respective operating system in the one or more memories 110a, 110b, 174) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110a, 110b, 174 may store an operating system (OS) (e.g., Microsoft Windows, Linux, Unix, IOS, Android, etc.) capable of facilitating the functionalities, apps, methods, or other software as discussed herein. The one or more memories 110a, 110b, 174 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The one or more processors 108a, 108b, 172 may be connected to the one or more memories 110a, 110b, 174 via a computer bus responsible for transmitting electronic data, data packets, or otherwise electronic signals to and from the one or more processors 108a, 108b, 172 and one or more memories 110a, 110b, 174 in order to implement or perform the machine readable instructions, methods, processes, elements or limitations, as illustrated, depicted, or described for the various flowcharts, illustrations, diagrams, figures, and/ or other disclosure herein.

The one or more processors 108a, 108b, 172 may interface with the one or more memories 110a, 110b, 174 via the computer bus to execute the operating system (OS). The one or more processors 108a, 108b, 172 may also interface with the one or more memories 110a, 110b, 174 via the computer bus to create, read, update, delete, or otherwise access or interact with the data stored in the one or more memories 110a, 110b, 174 and/or external databases (e.g., a relational database, such as Oracle, DB2, MySQL, or a NoSQL based database, such as MongoDB). The data stored in the one or more memories 110a, 110b, 174 and/or an external database may include all or part of any of the data or information described herein.

The networking interfaces 112a, 112b, 176 may be configured to communicate (e.g., send and receive) data via one or more external/network port(s) to one or more networks or local terminals, such as network 106, described herein. In some embodiments, networking interfaces 112a, 112b, 176 may include a client-server platform technology such as ASP.NET, Java J2EE, Ruby on Rails, Node.js, a web service or online API, responsive for receiving and responding to electronic requests. The networking interfaces 112a, 112b, 176 may implement the client-server platform technology that may interact, via the computer bus, with the one or more memories 110a, 110b, 174 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112a, 112b, 176 may include, or interact with, one or more transceivers (e.g., WWAN, WLAN, and/or WPAN transceivers) functioning in accordance with IEEE standards, 3GPP standards, 4G standards, 5G standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the devices 102a, 102b, and the client device 170, via wireless communications based on any one or more of various wireless standards, including by non-limiting example, IEEE 802.11a/b/c/g (WIFI), the BLUETOOTH standard, or the like.

The input/output interfaces 114a, 114b, 178 may include or implement operator interfaces configured to present information to an administrator or operator and/or receive inputs from the administrator or operator. An operator interface may provide a display screen (e.g., display 122a, 122b or display 182) which a user/operator may use to visualize any images, graphics, text, data, features, pixels, and/or other suitable visualizations or information.

In one illustrative example, the devices 102a, 102b are devices made by a particular manufacturer; and a user of the client 170 uses the client application 173 to discover and communicate with the devices made by this particular manufacturer.

Figure 2:
FIG. 2 illustrates an example screen to display devices on a network.

FIG. 2 illustrates an example screen 200 displaying devices discovered on a network in accordance with an example herein. Specifically, the example of FIG. 2 illustrates a first device 210 (such as the first device 102a of FIG. 1), a second device 220 (such as the second device 102b of FIG. 1), and a third device 230.

The screen 200 may display any information regarding each of the devices 210, 220, 230. For example, the type of device (e.g., camera), a status of the device (e.g., connected or not connected to the network), IP address information, and/or a picture of the device may be displayed. The information may be displayed in list form or any other form.

Figure 3:
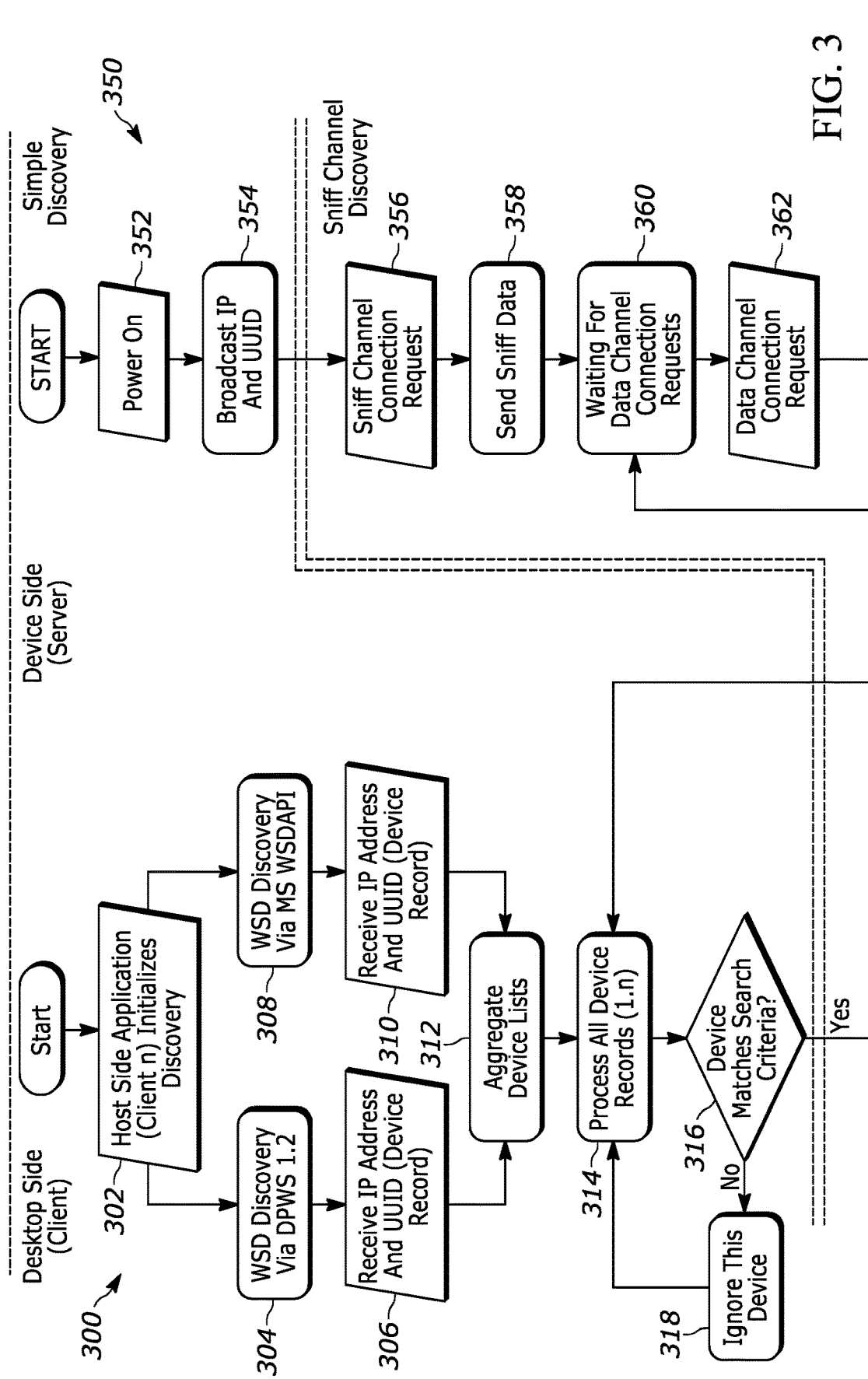
FIG. 3 illustrates flowcharts for implementing example methods and/or operations described herein.
Figure 3:
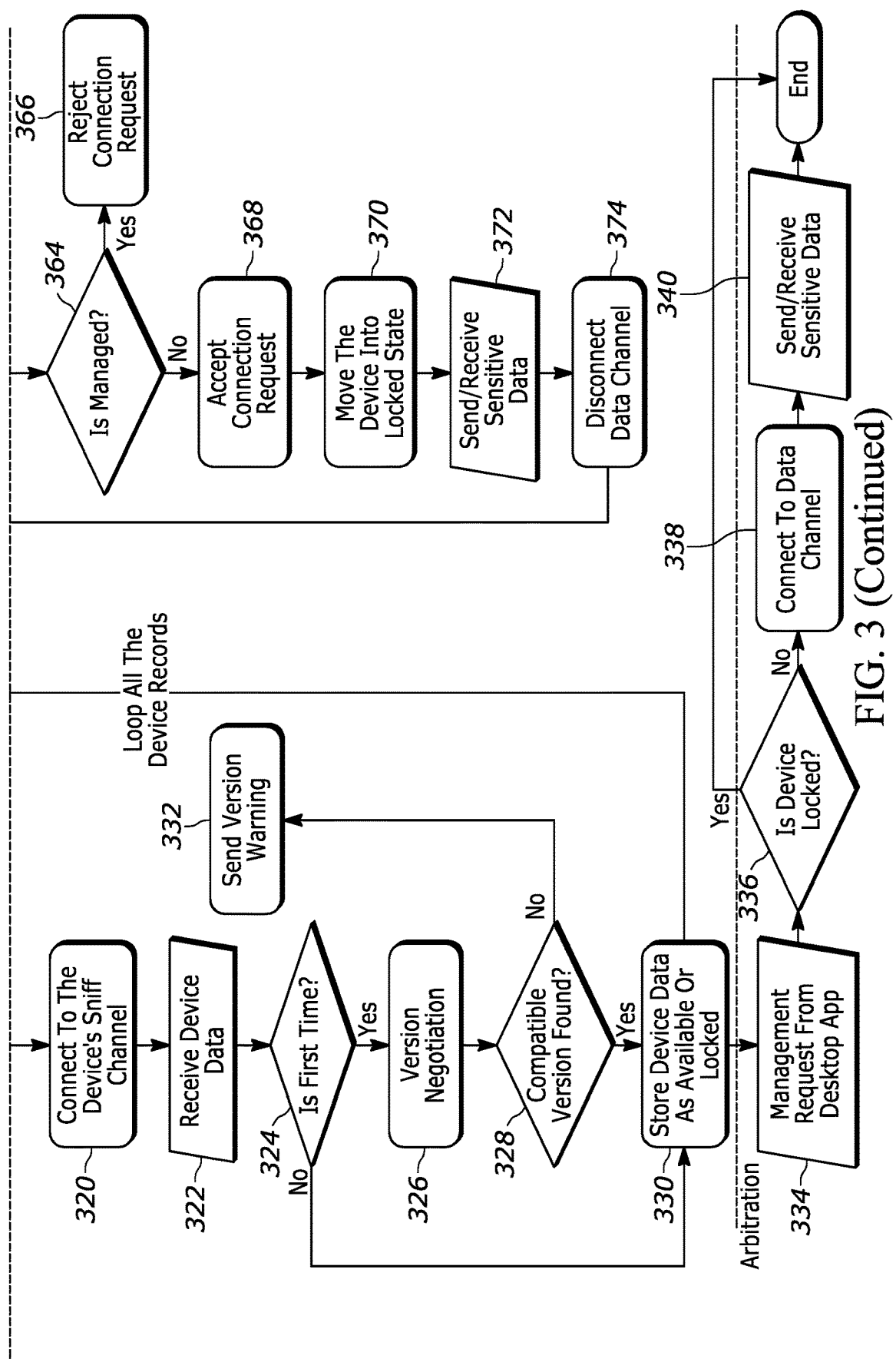

FIG. 3 illustrates flow diagrams of example methods 300, 350. The example method 300 may be performed by a desktop computer (e.g., a client device, such as the client 170 of FIG. 1) or any other computer processing device. At block 302, the example method begins, and the host side application (e.g., the client application 173 of FIG. 1) initializes discovery.

Subsequently, two processes may be performed. The first process comprises blocks 304 and 306; and the second process comprises blocks 308 and 310. It should be understood that the two processes may be executed in parallel, or with one process following the other process. Each of the two processes is used to discover devices on the network. Each process uses a network protocol, and a library of the protocol. The protocols may be the same or different protocols. If the protocols are the same, different libraries of the protocols are used. Executing two different processes in the manner allows for a more complete and robust device discovery. For example, the first process may discover some, but not all, of the devices on the network; and the second process may discover some or all of the devices missed by the first process.

In the example of FIG. 3, the protocols are the same, but the libraries are different. Specifically, the protocols of blocks 304 and 308 is the Web Services on Devices (WSD) protocol; and the library for block 304 is Devices Profile for Web Services (DPWS), while the library for block 308 is Web Services on Devices Application Programming Interface (WSDAPI). However, any suitable combination of protocols and libraries may be used.

In some implementations, block 304 is executed by the client application transmitting a first inquiry over the network; and the first inquiry may include a filter parameter. In some implementations, block 308 is executed by the client application transmitting a second inquiry over the network; and the second inquiry may also include a filter parameter. In some embodiments, for instance where the protocol used is the WSD protocol, the filter parameter may be Scope.

At blocks 306 and 310, an IP address is received and a universally unique identifier (UUID) (e.g., a hexadecimal number) is received. In some implementations, to identify a device as a particular type of device (e.g., a camera), or as from a particular manufacturer, the UUID may be compared to a UUID from a predetermined list of UUIDs. Thus, each of the first process (e.g., 304, 306) and the second process (e.g., 308, 310) generates a list of discovered devices on the network.

At block 312, the lists from the first process (e.g., 304, 306) and the second process (e.g., 308, 310) are aggregated to create an aggregated discovered device list. In this regard, duplicate devices (e.g., identified by the UUID and/or IP address) are removed during the aggregation. At block 314, all device records (e.g., 1 . . . n) are processed.

At block 316, the devices are compared to a search criteria. If a particular device does not match the search criteria, the example method proceeds to block 318, and the particular device is ignored. If the particular device does match the search criteria, the example method proceeds to block 320 (thereby exiting the simple discovery phase and entering the sniff channel discovery phase), and the client is connected to the particular device via a publisher/subscriber relationship (e.g., by a "sniff channel"). Information may be received, via the publisher/subscriber relationship, at block 322. In some embodiments, the publisher/subscriber relationship comprises connecting to the device by socket connection of the device. It should be understood that a publisher/subscriber relationship creates a way for the device to share information without creating a point-to-point connection. In this way, current information of each of the devices may be displayed, such as in the example display of FIG. 2.

Furthermore, it should be understood that a publisher/subscriber relationship may involve the sender of messages (e.g., "publishers") sending messages without specific receivers of the messages. The messages may be sent (e.g., "published") as also being categorized into classes. This allows potential receivers (e.g., "subscribers") of the messages to "subscribe" to certain classes of messages that are desired to be received.

Subsequently, optional blocks 324-332 may be performed. At block 324, it is determined if it is the first time data is received from the device. If so, a version negotiation occurs at block 326; and it is determined if a compatible version is found at block 328. If no compatible version is found, a version warning is sent at block 332. If a compatible version is found, device data is stored as available or locked at block 330. In addition, the method also proceeds to block 330 if the determination at block 324 is no.

The example method then proceeds to begin an arbitration phase. Specifically, at block 334, there is a management request. At block 336, it is determined if the device is locked. If not, at block 338, the device is connected to the data channel, and data is sent and received at block 340. If so, the method ends. However, if the device subsequently becomes unlocked, the device may be connected to the data channel so that data may be sent and received.

Further regarding the example method 300, it should be understood that blocks 302-312 may apply to a plurality of devices on the network, whereas blocks 314-340 apply to individual devices.

FIG. 3 further illustrates example method 350, which, in some embodiments, is performed on the device side (e.g., a server or other device). At block 352, during the simple discovery phase, the device is powered on. At block 354, the device broadcasts its IP address and UUID.

At block 356, during the sniff channel discovery phase, a sniff channel connection request (e.g., a publisher/subscriber connection request) is sent. At block 358, sniff data is sent. At block 360, the device waits for data channel connection requests. At block 362, the device receives a data channel connection request.

At block 364, the device makes an "is managed" determination to determine if the device is in a "managed" state. In some embodiments, a managed state is a software lock state that the device enters when a client application "manages" it. For example, any operation that would change the state of the device (e.g., taking a picture, changing configuration, etc.) would require the device to be in this managed state. On the other hand, simply viewing the state of the device (e.g., checking temperature, checking disk space, etc.) does not require a managed state. If the determination is affirmative, the data channel connection request is rejected at block 366. If negative, the data channel connection request is accepted at block 368.

At block 370, the device is moved into the locked state. At block 372, data is sent and received over the data channel. In some embodiments, this data is sensitive data. At block 374, the device is disconnected from the data channel, and the method returns to block 360. Thus, in some embodiments, the example method allows for transmission of sensitive data via the data channel, and transmission of non-sensitive data via the sniff channel.

Figure 4:
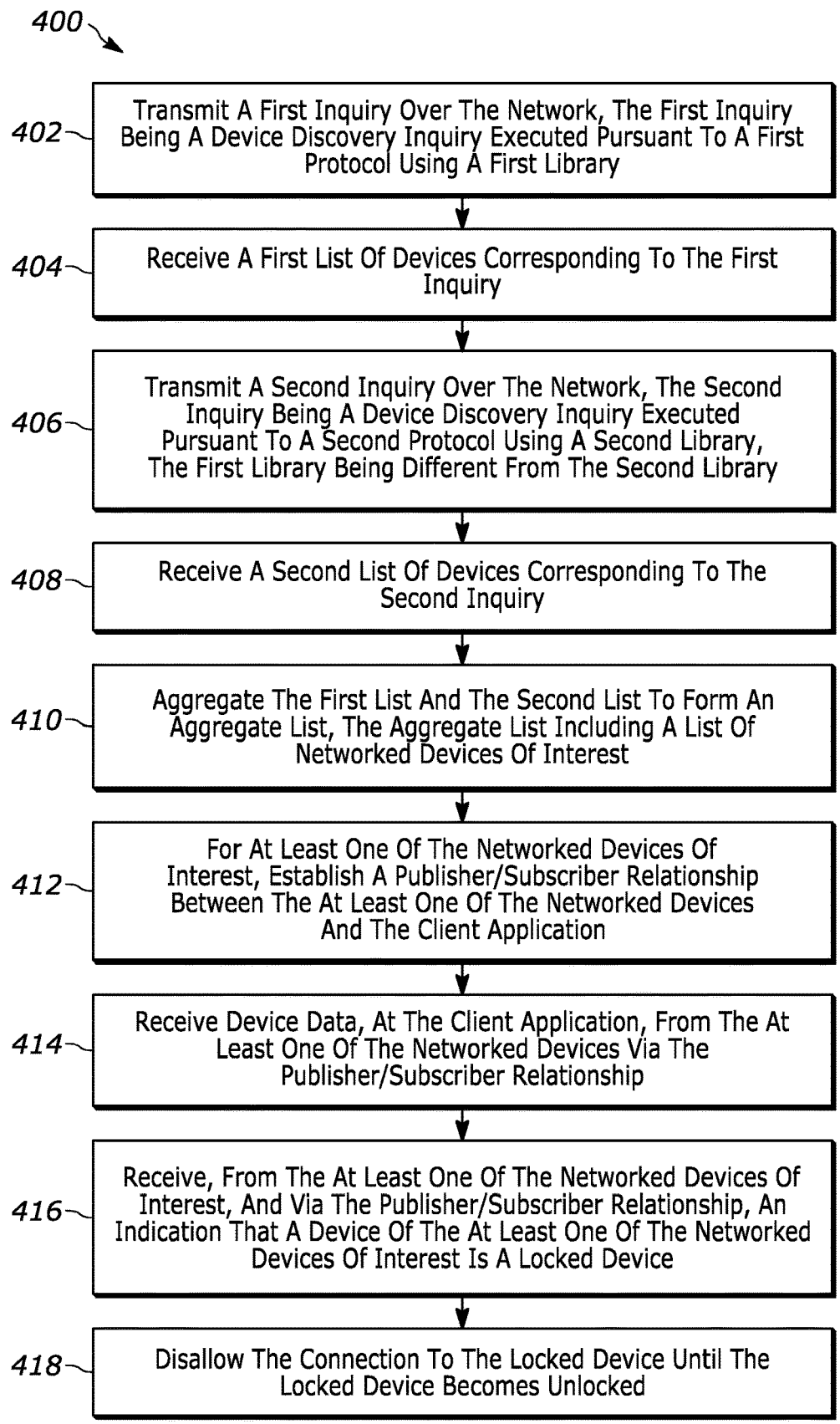
FIG. 4 illustrates another flowchart for implementing example methods and/or operations described herein.

FIG. 4 illustrates an example method 400. In some embodiments, the example method 400 may be performed by the client application 173. At block 402, the method begins by transmitting a first inquiry over the network, the first inquiry being a device discovery inquiry executed pursuant to a first protocol using a first library. At block 404, a first list of devices corresponding to the first inquiry is received. At block 406, a second inquiry is transmitted over the network, the second inquiry being a device discovery inquiry executed pursuant to a second protocol using a second library, the first library being different from the second library. At block 408, a second list of devices corresponding to the second inquiry is received. At block 410, the first list and the second list are aggregated to form an aggregate list, the aggregate list including a list of networked devices of interest. At block 412, for at least one of the networked devices of interest, a publisher/subscriber relationship is established between the at least one of the networked devices and the client application. At block 414, device data, at the client application, is received from the at least one of the networked devices via the publisher/subscriber relationship.

Subsequently, the example method proceeds to an arbitration phase. Specifically, at block 416, from the at least one of the networked devices of interest, and via the publisher/subscriber relationship, an indication is received that a device of the at least one of the networked devices of interest is a locked device. At block 418, the connection to the locked device is disallowed until the locked device becomes unlocked.

Additionally, it is to be understood that each of the actions described in the example methods 300, 350, 400 may be performed in any order, number of times, or any other suitable combination(s). For example, some or all of the blocks of the methods 300, 350, 400 may be fully performed once or multiple times. In some example implementations, some of the blocks may not be performed while still effecting operations herein.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. A method for discovering networked devices on a network having a client application executing on a client device communicatively coupled to the networked devices, the method comprising:

transmitting, via the client application, a first inquiry over the network, the first inquiry being a device discovery inquiry executed pursuant to a first protocol using a first library;

receiving, at the client application, a first list of devices corresponding to the first inquiry;

transmitting, via the client application, a second inquiry over the network, the second inquiry being a device discovery inquiry executed pursuant to a second protocol using a second library, the first library being different from the second library;

receiving, at the client application, a second list of devices corresponding to the second inquiry;

aggregating the first list and the second list to form an aggregate list, the aggregate list including a list of networked devices of interest;

for at least one of the networked devices of interest, establishing a publisher/subscriber relationship between the at least one of the networked devices and the client application; and receiving device data, at the client application, from the at least one of the networked devices via the publisher/subscriber relationship, wherein the first protocol and the second protocol are the same, and wherein the first protocol and the second protocol is a Web Services on Devices protocol.

2. The method of claim 1, wherein at least one of the first inquiry or the second inquiry includes a filter parameter.

3. The method of claim 2, wherein at least one of the first protocol or the second protocol is a Web Services on Devices protocol, and wherein the filter parameter is Scope.

4. The method of claim 1, wherein the first inquiry and the second inquiry are executed in parallel.

5. The method of claim 1, further comprising filtering at least one of the first list or the second list based on a filter parameter.

6. The method of claim 1, wherein the establishing the publisher/subscriber relationship includes connecting to the at least one of the networked devices, via the client application, by a socket connection of the at least one of the networked devices.

7. The method of claim 1, wherein the publisher is the at least one of the networked devices and wherein the subscriber is the client application.

8. The method of claim 1, further comprising performing arbitration by:

receiving, at the client application, from the at least one of the networked devices, and via the publisher/subscriber relationship, an indication that a device of the at least one of the networked devices is a locked device; and disallowing the connection to the locked device until the locked device becomes unlocked.

9. An apparatus for discovering networked devices on a network, the apparatus comprising one or more processors configured to execute a client application, the client application configured to:

transmit a first inquiry over the network, the first inquiry being a device discovery inquiry executed pursuant to a first protocol using a first library;

receive a first list of devices corresponding to the first inquiry;

transmit a second inquiry over the network, the second inquiry being a device discovery inquiry executed pursuant to a second protocol using a second library, the first library being different from the second library;

receive a second list of devices corresponding to the second inquiry;

aggregate the first list and the second list to form an aggregate list, the aggregate list including a list of networked devices of interest;

for at least one of the networked devices of interest, establish a publisher/subscriber relationship between the at least one of the networked devices and the client application; and receive device data from the at least one of the networked devices via the publisher/subscriber relationship, wherein the establishing the publisher/subscriber relationship includes connecting to the at least one of the networked devices, via the client application, by a socket connection of the at least one of the networked devices.

10. The apparatus of claim 9, wherein the first protocol and the second protocol are the same.

11. The apparatus of claim 10, wherein the first protocol and the second protocol is a Web Services on Devices protocol.

12. The apparatus of claim 9, wherein at least one of the first inquiry or the second inquiry includes a filter parameter.

13. The apparatus of claim 12, wherein at least one of the first protocol or the second protocol is a Web Services on Devices protocol, and wherein the filter parameter is Scope.

14. The apparatus of claim 9, wherein the client application is further configured to execute the first inquiry and the second inquiry in parallel.

15. The apparatus of claim 9, wherein the client application is further configured to filter at least one of the first list or the second list based on a filter parameter.

16. The apparatus of claim 9, wherein the publisher is the at least one of the networked devices and wherein the subscriber is the client application.

17. The apparatus of claim 9, wherein the client application is further configured to perform arbitration by:

receiving, at the client application, from the at least one of the networked devices, and via the publisher/subscriber relationship, an indication that a device of the at least one of the networked devices is a locked device; and disallowing the connection to the locked device until the locked device becomes unlocked.

18. A method for discovering networked devices on a network having a client application executing on a client device communicatively coupled to the networked devices, the method comprising:

transmitting, via the client application, a first inquiry over the network, the first inquiry being a device discovery inquiry executed pursuant to a first protocol using a first library;

receiving, at the client application, a first list of devices corresponding to the first inquiry;

transmitting, via the client application, a second inquiry over the network, the second inquiry being a device discovery inquiry executed pursuant to a second protocol using a second library, the first library being different from the second library;

receiving, at the client application, a second list of devices corresponding to the second inquiry;

aggregating the first list and the second list to form an aggregate list, the aggregate list including a list of networked devices of interest;

for at least one of the networked devices of interest, establishing a publisher/subscriber relationship between the at least one of the networked devices and the client application; and receiving device data, at the client application, from the at least one of the networked devices via the publisher/subscriber relationship, wherein the establishing the publisher/subscriber relationship includes connecting to the at least one of the networked devices, via the client application, by a socket connection of the at least one of the networked devices.

\* \* \* \* \*